May 15, 1962 H. STEUER 3,034,367
CONE PULLEY DRIVE
Filed April 14, 1960 2 Sheets-Sheet 1

INVENTOR.
HErbErT STEuEr
BY Bailey, Stephens Huettig
ATTORNEYS

May 15, 1962 H. STEUER 3,034,367
CONE PULLEY DRIVE

Filed April 14, 1960 2 Sheets-Sheet 2

INVENTOR:
Herbert Steuer
BY
Bailey, Stephens & Huettig
Attorneys

United States Patent Office 3,034,367
Patented May 15, 1962

3,034,367
CONE PULLEY DRIVE
Herbert Steuer, Bad Homburg vor der Hohe, Germany, assignor to Reimers-Getriebe KG., Ascona, Switzerland, a firm of Switzerland
Filed Apr. 14, 1960, Ser. No. 22,180
Claims priority, application Germany Apr. 30, 1959
4 Claims. (Cl. 74—230.17)

The present invention relates to a pulley drive of the type in which each of two V-belt pulleys, which are connected by an endless belt or link chain to transmit a driving force from one to the other, consists of a pair of conical disks which are rotatably mounted on a common shaft and are connected to each other by a sleeve bushing so as to be non-rotatable but slidable in the axial direction relative to each other, and in which one conical disk of each pair is associated with a pressure-applying device which presses this disk in the axial direction toward the other disk with a force which is dependent upon the transmitted torque, so that the friction surfaces of the two conical disks of each pulley will thus be automatically pressed with such an axial force against the belt or chain. The pressure which is transmitted from the axially displaceable pulley disk through the belt or chain to the other disk is then taken up by a stop member which is secured to the shaft on which both disks are rotatably mounted.

The pulley drives of this type which are presently known have one serious disadvantage, namely, that their individual pulley disks must be provided with relatively long tubular hubs in order to prevent the disks from tilting or canting. Consequently, such drive units have a considerable length and are thus also unduly heavy.

It is an object of the present invention to overcome this disadvantage of the known pulley drive units of this type and to provide a similar drive unit which, without loss in efficiency as compared with previous units, takes up considerably less space and is of a considerably lower weight.

According to the present invention, this object may be attained by providing the shaft on which the two conical disks of each pulley are rotatably mounted with a bracing disk which is rigidly secured thereto, and adapted to take up the pressure from the pulley disk which is exerted thereon by the belt or chain, so that this pulley disk will be rotatably supported in the axial direction near its outer periphery, and will also be supported by the bracing disk in the radial direction. Thus, in order to prevent this pulley disk from tilting or canting, it no longer has to be provided with a long hub portion and, since the pulley disk together with its bracing disk are considerably shorter than the hub portion previously required, the overall length of the entire drive unit will also be considerably shorter and the drive unit will also be of a lower weight.

According to a further feature of the invention, the pulley disk is preferably supported on the bracing disk by means of at least one antifriction bearing in the form of balls or rollers which are interposed between the two disks. Thus, one bearing may be provided for transmitting the axial forces and another bearing for transmitting the radial forces to the bracing disk. However, it is also possible to provide a single oblique bearing to transmit both the axial and radial forces to the bracing disk.

The bracing disk according to the invention is rigidly secured to the shaft on which the two pulley disks are running, and it is advisable to make the bracing disk and this shaft of a single piece of material.

Still another feature of the invention consists in loosely connecting the pulley disk to the bracing disk by providing a safety ring which is connected at one side to the peripheral surface of the pulley disk and is beveled inwardly on the other side so as to overlap the outer edge of the bracing disk. Aside from covering the bearing or bearings between the two disks, this safety ring has the advantage that, in the event that the belt or chain has to be removed for a service or repair, the pulley disk will not separate from the bracing disk and the balls or rollers will not fall out from their race surfaces on these disks.

These as well as other objects, features, and advantages of the present invention will become further apparent from the following detailed description thereof, particularly when the same is read with reference to the accompanying drawings, in which—

FIGURE 2 shows a similar view of a modification of the invention; while

Figure 1:
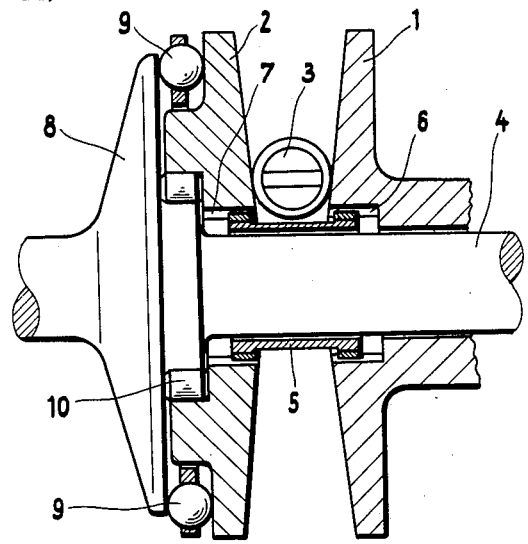
FIGURE 1 shows a side view, largely in cross section, of a set of conical pulley disks according to the invention.

In these drawings, FIGURE 1 shows a pair of conical disks 1 and 2 which together form a V-belt pulley for transmitting a driving force by means of a roller link chain 3. Disk 1 which is to be acted upon by a suitable pressure-applying device, not shown, is mounted on a shaft 4 so as to be rotatable as well as slidable thereon in the axial direction. A sleeve bushing 5 is likewise rotatably mounted on shaft 4 and slidably connected to pulley disks 1 and 2 by means of splines 6 in an annular recess in disk 1 and splines 7 in a similar recess in disk 2, so that the two pulley disks 1 and 2 will thus be connected so as to be non-rotatable but slidable in the axial direction relative to each other. According to the invention, shaft 4 is rigidly secured to a bracing disk 8 which, near its periphery, is adapted to take up the pressure which is exerted upon pulley disk 2 and to support the latter in the axial direction. Bracing disk 8 also serves to support and guide the pulley disk 2 in the radial direction. In view of the strong forces which occur when chain 3 is wedged between the two pulley disks 1 and 2, it is preferable to support pulley disk 2 on bracing disk 8 by interposing a plurality of rolling bodies between these disks. Thus, in the embodiment of the invention as illustrated in FIGURE 1, the axial forces will be transmitted from pulley disk 2 to the bracing disk 8 by means of balls 9 which are guided within a cage, and the radial forces will be transmitted to bracing disk 8 by rollers 10. Bracing disk 8 and shaft 4 may be made of a single piece of material or disk 8 may be shrunk upon the shaft or be secured thereto in any other suitable manner. Since the bracing disk is rigidly secured to the shaft, it is possible to make this disk of such a cross-sectional shape that the total length of the drive unit and consequently also the weight thereof may be considerably reduced as compared with the conventional design of such a conical pulley disk with a long hub portion thereon. Since due to the omission of such a long hub which is a principal cause for the elastic deformation of the shaft, the point of application of the resultant from the tilting forces will be shifted more closely toward the center line between the two pulley disks, the entire unit consisting of the shaft and the pulley disks will have an increased rigidity without being otherwise enlarged in size as compared with similar units as were previously known.

Figure 2:
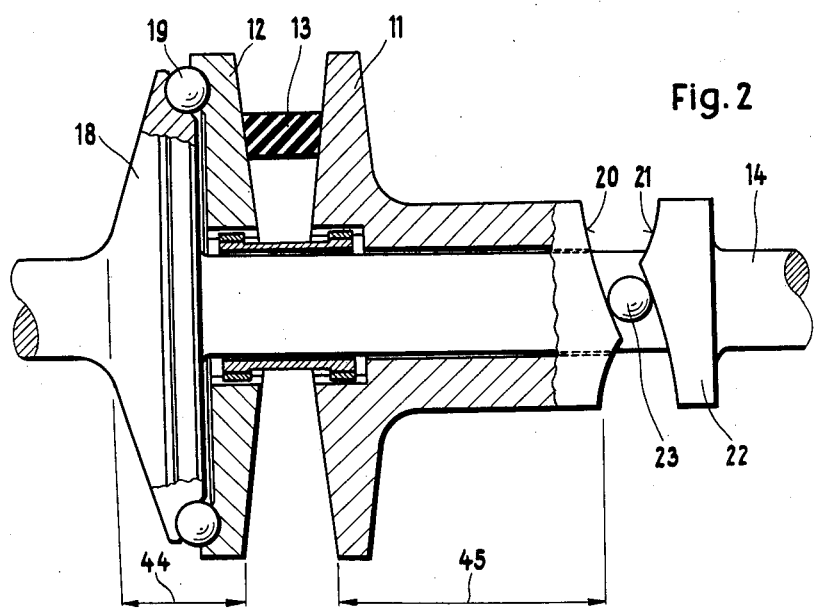

FIGURE 2 illustrates a modification of the invention according to which the conical pulley disk 12 is rotatably mounted on the bracing disk 18 by means of an oblique ball bearing 19 which is interposed between these two disks to take up both axial and radial forces. FIGURE 2 also illustrates a pressure-applying device as conventionally applied in connection with such drive unit for displacing the conical pulley disk 11 in the axial direction by means of an axial force which is produced in accordance with the torque of the drive shaft in order to maintain the belt or link chain under the required tension as well as under the required pressure against the friction surfaces of pulley disks 11 and 12. This pressure-applying device consists of corresponding cam tracks 20 and 21 which are respectively provided in the end surface of the hub of pully disk 11 and the opposite end surface of a cam bushing 22 which is rigidly secured to shaft 14. The force is transmitted from cam tracks 21 to cam tracks 20 by means of balls 23. If a torque is exerted upon shaft 14, pulley disk 11 will be forced under a pressure corresponding to the size of the angle of the torque against the V-belt 13 which will then be pressed against the other pulley disk 12. The extent at which the drive unit will be shortened in the axial direction by the provision of bracing disk 18 may be seen by a comparison of the required lengths 44 and 45 of the two disk parts 18 and 11.

Figure 3:
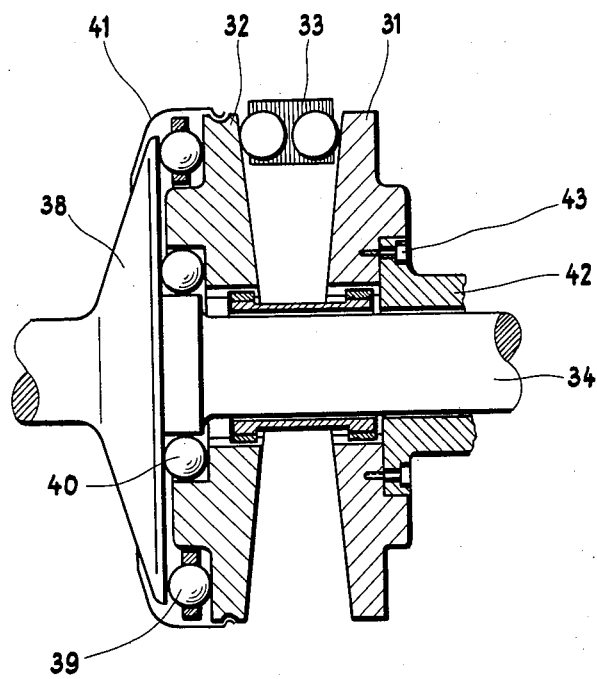
FIGURE 3 shows a similar view of a further modification of the invention.

FIGURE 3 shows a third embodiment of the invention in which the conical pulley disk 32 is supported in the axial direction by a bracing disk 38 in a similar manner as shown in FIGURE 1, namely, by means of balls 39 which are guided within a cage and are interposed between the two disks 32 and 38. The support of pulley disk 32 in the radial direction is, however, not carried out by means of rollers as in FIGURE 1, but by balls 40 which at the same time serve to transmit axial forces. Pulley disk 32 is thus supported along two concentrical circular tracks and is therefore given a still greater rigidity against elastic deformation than the embodiment according to FIGURE 1. For this reason, it would also be possible to reduce the axial length of pulley disk 32 to a still greater extent without any loss in rigidity. Obviously, if desired, and depending upon the particular requirements, it is also possible to use three or more sets of ball bearings in place of the two sets 39 and 40, as shown in FIGURE 3.

In order to prevent the pulley disk 32 from separating from the bracing disk 38 in the event of a removal of the chain or belt for the purpose of carrying out occasional repair or maintenance work, it is further advisable to provide suitable means for loosely connecting the two disks. Thus, for example, as illustrated in FIGURE 3, a safety ring 41 may be provided which is connected to pulley disk 32 along its peripheral surface and has an inwardly beveled edge portion which overlaps the peripheral edge of bracing disk 38. The driving power is transmitted in this embodiment by means of a double-roller chain 33. In order to simplify the production of the drive unit, the two pulley disks 31 and 32 may be made substantially alike, and the axially displaceable disk 31 may be subsequently provided with a tubular hub portion 42 which may be secured to the disk, for example, by bolts 43.

In order to exclude any possibility that the pulley disks might tilt at any speed ratio during the operation of the drive unit, it is advisable to make the largest diameter of rotation of the axial bearing at least of the same size as that of the diameter of the circle along which the resultant of all axial forces engages which are transmitted by the belt or chain to the pulley disks. Since this circle is generally smaller than the largest diameter of the running circle of the belt, the bracing disk may, as also clearly apparent from the drawing, be made of a considerably smaller outer diameter than the pulley disks.

Although this invention has been illustrated and described with reference to the preferred embodiments thereof, it should be understood that it is in no way limited to the details of such embodiments, but is capable of numerous modifications within the scope of the appended claims. Thus, for example, the type and arrangement of the rolling bodies may be considerably modified and different combinations of such bodies may be applied without departing from the concept and scope of the present invention. Furthermore, it is also possible to omit such rolling bodies entirely so that the conical pulley disks 2, 12, or 32 would then be supported directly by the bracing disk 8, 18, or 38.

The invention now having been fully disclosed, what is claimed is:

1. A pulley drive comprising two V-belt pulleys and an endless member connecting said pulleys for transmitting a driving force from one pulley to the other, each of said pulleys comprising a pair of conical disks, a shaft, said disks being rotatably mounted on said shaft, a sleeve bushing on said shaft, means for connecting said disks to said bushing so as to be non-rotatable thereon but free to slide in the axial direction relative to each other, a pressure-applying device associated with one of said disks of each pulley for pressing the same in the axial direction toward the second disk with a force dependent upon the transmitted torque and for thus compressing said endless transmitting member between said disks of each pair, and a bracing disk rigidly secured to said shaft at the side of said second disk remote from said first disk and anti-friction means operatively engaged directly between said bracing disk and said second disk for rotatably supporting said second disk at least near its outer periphery in the axial direction on said bracing disk to resist canting moments exerted on the second disk by the endless member and for also supporting said second disk in the radial direction on said bracing disk to transmit radial forces exerted on the second disk to the shaft, said means permitting free turning movement between the bracing disk and the second disk without exerting an axial displacing force on the second disk, whereby the second disk remains axially stationary on the shaft.

2. A pulley drive as defined in claim 1, in which said last means comprise rotatable antifriction bearing means interposed between said second pulley disk and said bracing disk for transmitting the axial forces to said bracing disk, and other rotatable antifriction bearing means for transmitting the radial forces to said bracing disk.

3. A pulley drive as defined in claim 1, in which said last means comprise an oblique ball bearing interposed between said second pulley disk and said bracing disk for transmitting both the axial and radial forces to said bracing disk.

4. A pulley drive as defined in claim 1, further comprising an annular member loosely connecting said second pulley disk to said bracing disk, said member being connected at one side to said pulley disk near the outer periphery thereof, and extending over the outer periphery of said bracing disk and beveled inwardly over said bracing disk.

References Cited in the file of this patent
UNITED STATES PATENTS

| | | |
|---|---|---|
| 1,386,160 | Chesnutt | Aug. 2, 1921 |
| 2,611,464 | Rabe | Sept. 23, 1952 |
| 2,694,316 | Hultin | Nov. 16, 1954 |

FOREIGN PATENTS

| | | |
|---|---|---|
| 707,455 | Germany | June 23, 1941 |